United States Patent [19]

Finch et al.

[11] Patent Number: 5,091,634
[45] Date of Patent: Feb. 25, 1992

[54] COUPON VALIDATION TERMINAL

[75] Inventors: John W. Finch, Thornhill; Gary Wild, Downsview, both of Canada

[73] Assignee: Scantech Promotions Inc., Richmond Hill, Canada

[21] Appl. No.: 416,878

[22] Filed: Oct. 4, 1989

[30] Foreign Application Priority Data

Oct. 4, 1988 [GB] United Kingdom .................. 8823301

[51] Int. Cl.[5] ............................................. G06F 15/20
[52] U.S. Cl. .................................. 235/375; 235/383; 235/385; 235/487
[58] Field of Search ................ 364/401, 412; 235/375, 235/383, 385, 487, 494

[56] References Cited

U.S. PATENT DOCUMENTS

| | | | |
|---|---|---|---|
| 3,937,926 | 2/1976 | Jones et al. | 235/61 |
| 4,166,540 | 9/1979 | Marshall | 235/375 |
| 4,372,681 | 2/1983 | Sallenbach | 356/72 |
| 4,667,553 | 6/1987 | Roberts et al. | 364/412 |
| 4,723,212 | 2/1988 | Mindrum | 235/487 |
| 4,859,839 | 8/1989 | Tetelman | 235/487 |

*Primary Examiner*—Harold Pitts
*Attorney, Agent, or Firm*—Merchant & Gould, Smith, Edell, Welter & Schmidt

[57] ABSTRACT

A coupon validation system for interpreting coupons presented thereto, each of the coupons incorporating a bar code having a validation date and a message code. The system comprises a real time clock for maintaining a current date record, a memory for storing one or more winning number codes, apparatus for receiving a coupon presented to the system and in response reading the bar code, and a microcomputer for comparing the validation date with the current date record and in the event the current date record is not equal to the validation date then rejecting the coupon, and in the event the current date record is equal to the validation date then comparing the one or more winning number codes with the message code and in the event they are equal generating a message for indicating that the coupon is a winner, and in the event the one or more winning number codes and the message code and are not equal then generating an alternative message for indicating that the coupon is not a winner. The system also includes a voice synthesizer for generating audio messages. The memory is removable and includes data for implementing a voice synthesis algorithm.

25 Claims, 6 Drawing Sheets

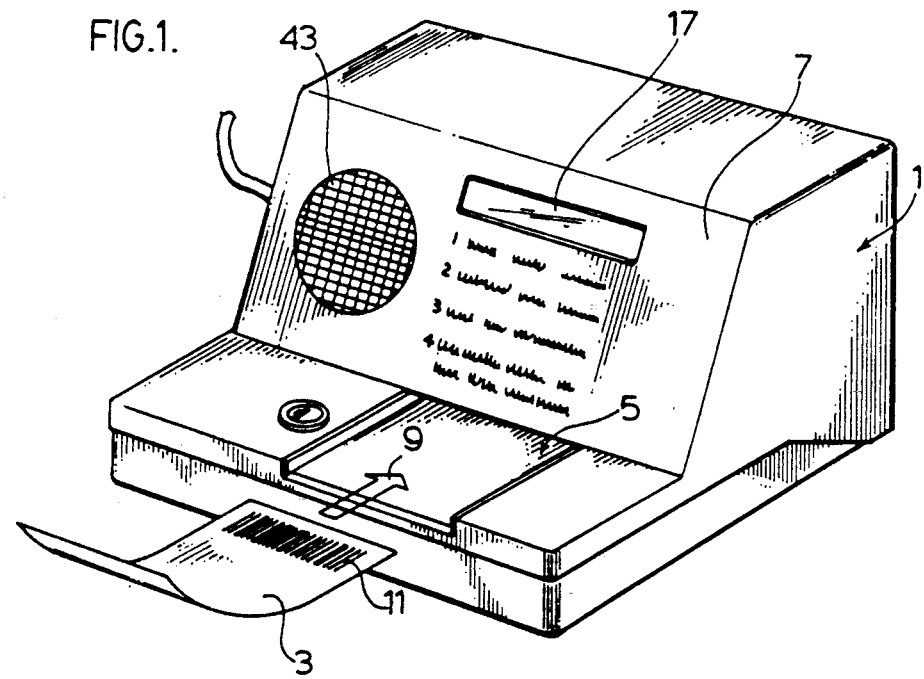
FIG.1.
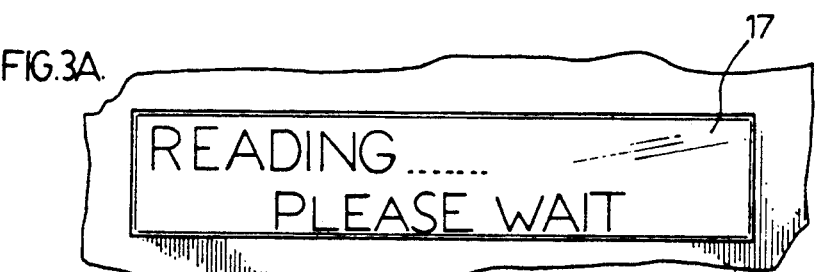
FIG.3A. READING....... PLEASE WAIT
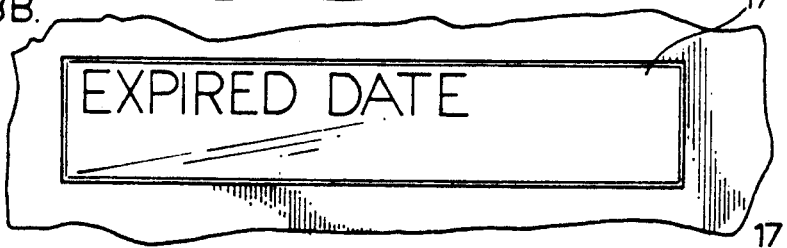
FIG.3B. EXPIRED DATE
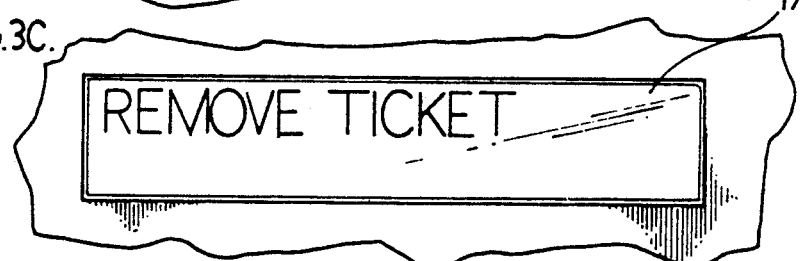
FIG.3C. REMOVE TICKET
FIG.3D. YOU ARE A WINNER!!!

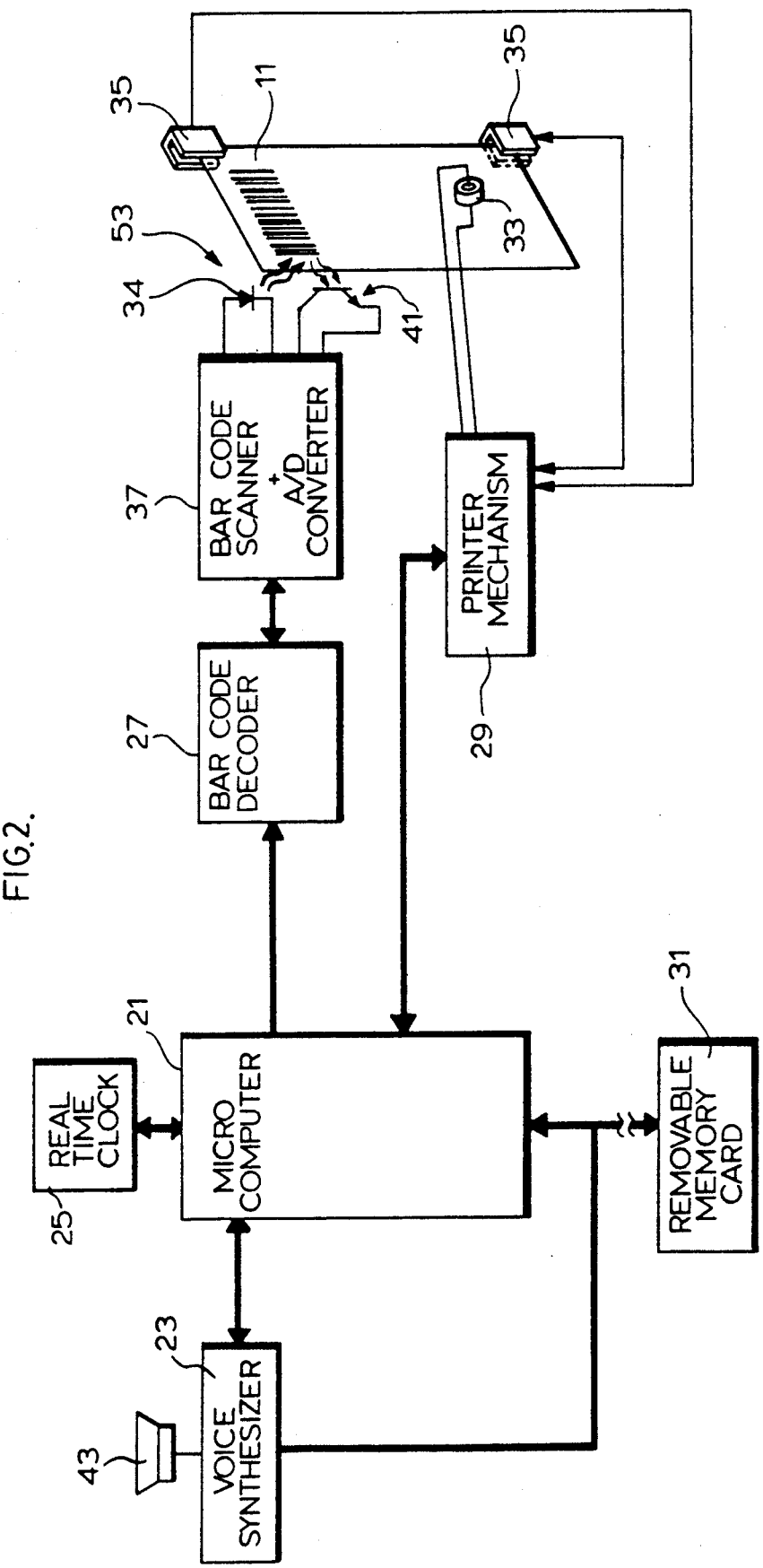

ise and diverse number of coupons that have been distributed. Although coupons are a successful way to promote, they are fraught with serious problems which negate the total effectiveness of the coupon program. For example, coupons may be redeemed by customers well before or after their valid dates, and in many cases whole books of coupons may be redeemed at one time regardless of the valid date on the coupon. Mystery prizes or discounts (often concealed by a concealment device which is scratched off to reveal the prize won or discount to be received) are often illegally and fraudulently misused in order to reveal the prize to the retailer before the customer is given the coupon. Coupons which have a concealment device to conceal a winning prize are also often fraudulently redeemed by dealers/-franchisers. Coupons distributed by one retailer are often redeemed by his or her competitors. Millions of potential promotional dollars have been lost by the promoting companies because of these fraudulent practices.

COUPON VALIDATION TERMINAL

FIELD OF THE INVENTION

This present invention relates in general to coupon reading systems, and more particularly to a novel coupon validation terminal for extracting bar code information from a coupon and in response indicating either a win or a loss, or voiding the coupon in the event that it is invalid.

BACKGROUND OF THE INVENTION

Annually, millions of dollars worth of coupons are distributed by retail businesses to attract new customers and encourage more purchases from existing customers. Although coupons are a successful way to promote, they are fraught with serious problems which negate the total effectiveness of the coupon program. For example, coupons may be redeemed by customers well before or after their valid dates, and in many cases whole books of coupons may be redeemed at one time regardless of the valid date on the coupon. Mystery prizes or discounts (often concealed by a concealment device which is scratched off to reveal the prize won or discount to be received) are often illegally and fraudulently misused in order to reveal the prize to the retailer before the customer is given the coupon. Coupons which have a concealment device to conceal a winning prize are also often fraudulently redeemed by dealers/-franchisers. Coupons distributed by one retailer are often redeemed by his or her competitors. Millions of potential promotional dollars have been lost by the promoting companies because of these fraudulent practices.

The need exists for ensuring that coupons will be redeemed as intended so that the company issuing the coupons fully obtains the benefits of their couponing programs.

Recently, systems have been developed for reading bar codes applied to coupons or tickets for the purpose of validating same.

U.S. Pat. No. 3,937,926 (Jones et al) discloses a bar code reader for sensing a plurality of patterns on a document in a predetermined sequence. The Jones et al Patent provides a general overview of well known prior art bar code readers.

U.S. Pat. No. 4,677,553 (Roberts et al) discloses a lottery ticket device which incorporates sensors for reading a bar code, a printer for indicating a win to the purchaser as well as printing on the bar code a validation mark, and a sensor for determining the presence of the validation mark. The validation information is embedded within a "V" sector of the bar code.

The invention of Roberts et al suffers from the disadvantage that there is no mechanism by which the system is capable of determining whether a coupon has been presented within a valid time frame, with the result that coupons may be redeemed fraudulently by customers well before or after the valid dates, as discussed above.

SUMMARY OF THE INVENTION

In order to overcome the serious problems inherent with coupons and also to add an element of fun and chance to couponing programs, the coupon validation terminal of the present invention incorporates a number of enhanced features.

The coupon validation terminal includes a coupon bar code reader and printer. Coupons are designed for use with the system incorporating a bar code having a validation date and a number or message code. The bar code on the coupon is read by the bar code reader incorporated within the validation terminal. In the event that the coupon is valid, the bar coded number on the coupon read by the bar code reader will match a number previously programmed into a central microcomputer of the validation terminal. The microcomputer software tests the number or code embedded in the bar code to determine if it is a winning coupon.

Upon recognition of a winning number or message incorporated within the coupon bar code, the validation terminal of the present invention prints on the coupon the prize which corresponds to the pre-programmed number or the message incorporated within the coupon's bar code. Otherwise, the validation terminal prints an appropriate "sorry, try again" message.

However, in the event that the coupon presented is not valid (i.e. it is presented prior to or after the period for which the coupon is valid), the validation terminal prints an appropriate "void" message. In this regard, the validation date extracted from the coupon bar code is compared to an internal free running real time clock incorporated within the validation terminal.

Thus, according to the present invention a system is provided for coupon validation which effectively eliminates the possibility of fraudulent redeeming of the coupon outside of a predetermined validation time frame.

In general, according to an aspect of the present invention there is provided a coupon validation system for interpreting coupons presented thereto, each of said coupons incorporating a bar code having a range of validation dates and a message code, said system comprising:

a) a real time clock for maintaining a current time and date record;

b) means for storing one or more winning number codes;

c) means for receiving a coupon presented to said system and in response reading said bar code; and d) means for comparing said range of validation dates with said current time and date record and in the event said current time and date record is not within said range of validation dates then rejecting said coupon, and in the event said current time and date record is within said range of validation dates then comparing said one or more winning number codes with said message code and in the event they are equal generating a message for indicating that said coupon is a winner, and in the event said one or more winning number codes and said message code are not equal then generating an alternative message for indicating that said coupon is not a winner.

INTRODUCTION TO THE DRAWINGS

The invention is described further, by way of illustration with reference to the accompanying drawings, in which:

FIG. 1 is a perspective view of the coupon validation terminal of the present invention, FIG. 2 is a block diagram of functional circuitry incorporated within the coupon validation terminal of the present invention, FIGS. 3A-3D illustrate a series of messages appearing on an LCD display of the coupon validation terminal on FIG. 1:

DETAILED DESCRIPTION OF THE INVENTION

Figure 4:
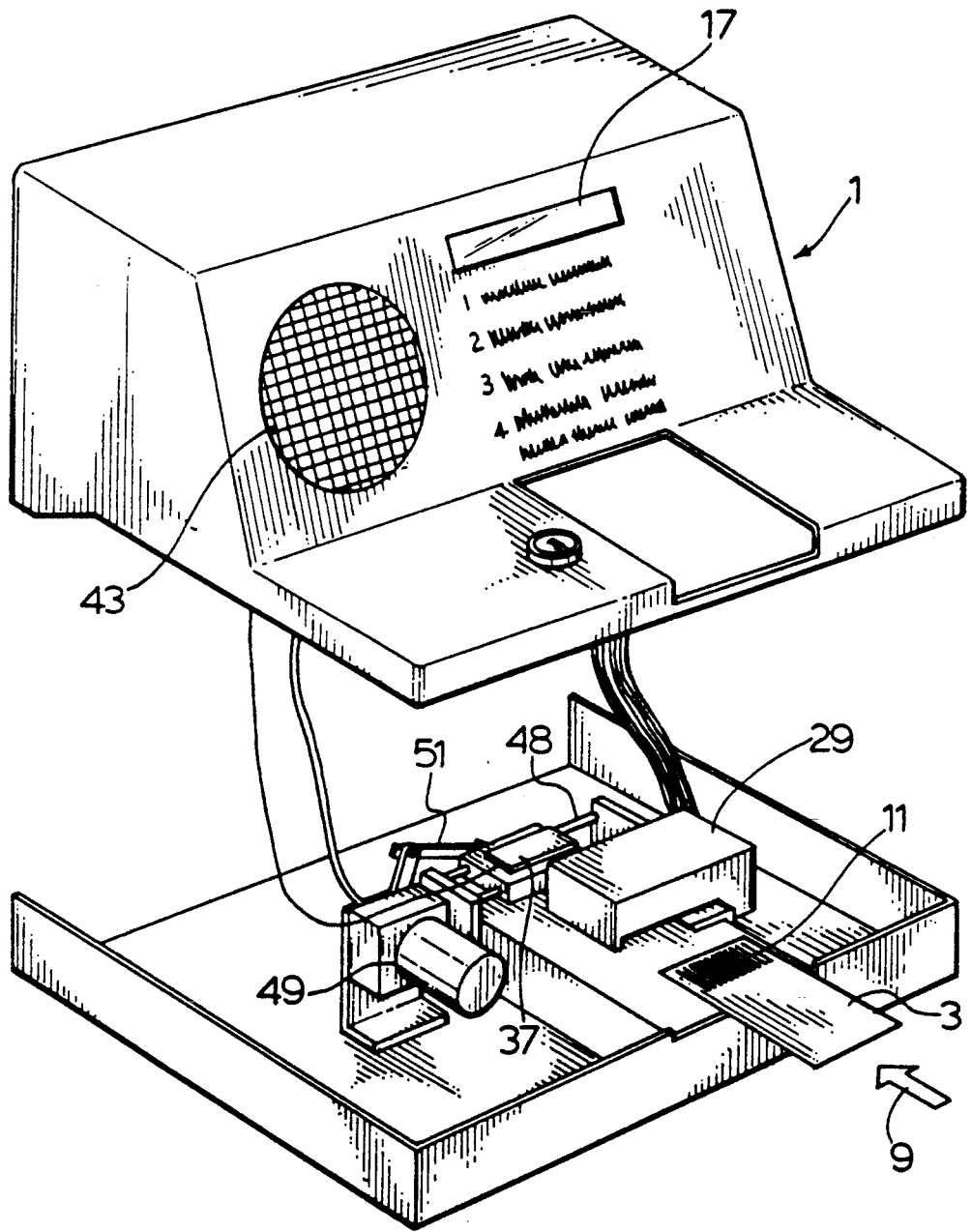
FIG. 4 shows the coupon validation terminal of FIG. 1 in an open position.
Figure 5:
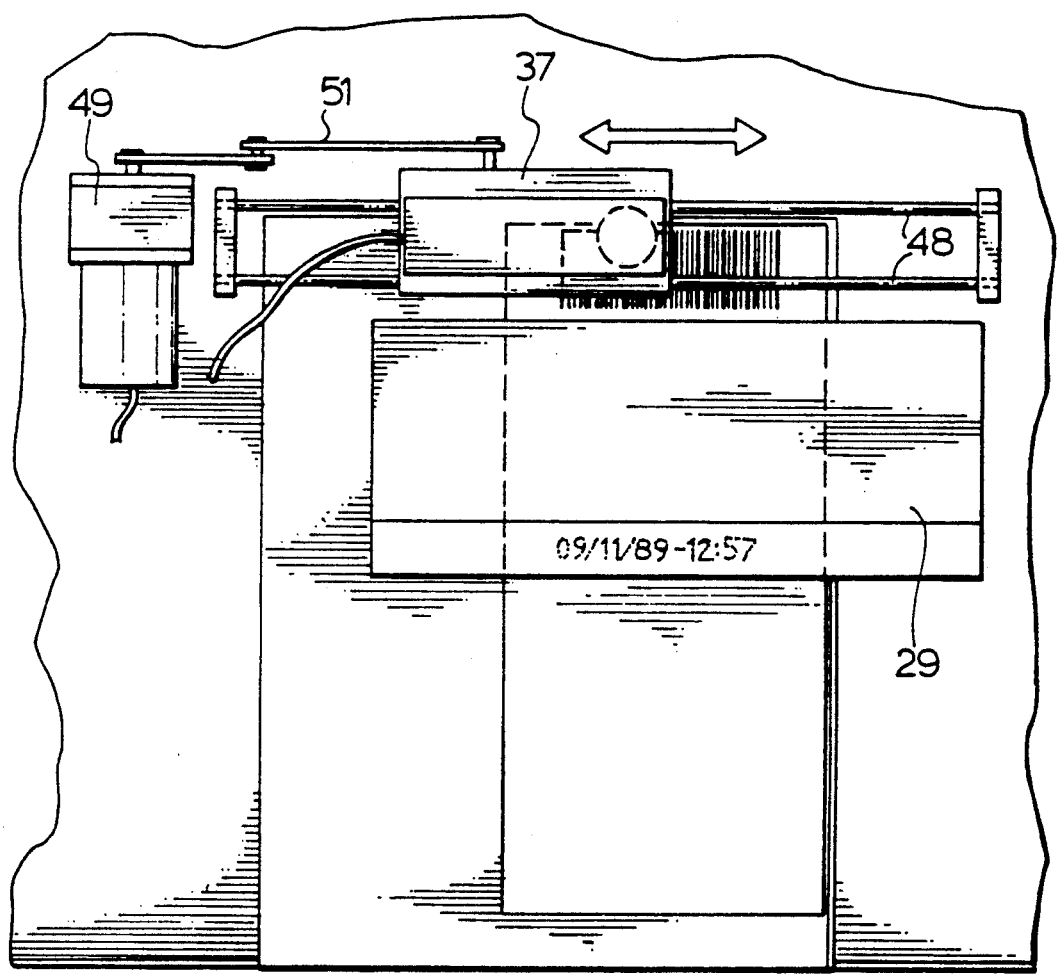
FIG. 5 is a plan view of a movable scanner in the coupon validation terminal of the present invention.

With reference to FIG. 1, the coupon validation terminal 1 is shown for receiving a coupon 3 which is inserted along a horizontal surface 5 beneath a shroud or cover 7 housing a bar cods scanner (FIG. 2). Upon inserting the coupon 3 in the direction designated by arrow 9, a clutch within the cover 7 descends and engages the coupon 3 for positioning the coupon relative to the bar code scanner.

The bar code scanner is mounted on a movable scanner head for scanning the bar code 11 as will be discussed in greater detail below with reference to FIG. 3. To this and, optical sensors are provided for detecting the edges of the coupon 3 and conveying this information to an internal microcomputer for controlling the positioning cf coupon 3 relative to the bar code scanner.

An LCD display 17 and speaker 43 are provided for generating visual and audio message prompts to a user of the system.

Turning to FIG. 2, a microcomputer 21 is shown connected to a voice synthesizer 23, a real time clock 25, a bar graph decoder 27 and a printer and position controller 29. The microcomputer 21 and voice synthesizer 23 are also connected via appropriate interface couplers to a removable memory card 31.

Removable memory card 31 is programmed with data in the form of specific numbers indicative of a winning coupon. Also, memory card 31 stores prerecorded digital voice message for indicating the type of prize won, discount received, or a message indicating that the coupon redeemer has not won a prize and should try again. This data is accessed by microcomputer 21 periodically during operation of the coupon validation terminal. The data is preferably encoded within removable memory card 31 by a central terminal leasing authority in such a way as to be inaccessible to employees or operators of the terminal. This way, tampering and fraudulent use of the equipment is avoided.

As an alternative to physically removing memory card 31 from the terminal and transporting to a central programming site (i.e. leasing authority), it is contemplated that the leading authority may program the memory card remotely by means of a serial link such as modem and telephone lines.

In operation, optodetectors 35 detect an edge of a coupon, and in response microcomputer 21 generates a control signal to printer mechanism 29 for causing clutch mechanism or roller 33 to engage the coupon 3 and in conjunction with the optodetectors 35 positions the coupon 3 for correct reading of the bar code 11 via bar code scanner 7. The display 17 will simultaneously generate a message such a "READING ... PLEASE WAIT" (FIG. 3A). Bar code scanner 37 preferably includes a light emitting device 34 for generating light to be reflected off the bar code surface 11, and a light detecting device 41 for detecting variations in reflected light and transmitting the detected variations to bar code decoder 27. In response, bar code decoder 27 formulates a digital code indicative of the range of validation date data encoded within bar code 11 as well as the coupon number data encoded therein and passes this data onto microcomputer 21.

Microcomputer 21 then compares the validation date data with the real time and date information received from real time clock 25. In the event that the date data of coupon 3 indicates that the coupon is valid, microcomputer 21 further compares the coupon number data with the predetermined coupon number stored in the memory card 31. In the event a match, microcomputer 21 activates voice synthesizer 23 to generate an audible message via loudspeaker 43 responsive to predetermined digital messages stored within removable memory card 31, indicating that the coupon redeemer has won a specific prize. At the same time, microcomputer 21 generates control signals for causing printer 29 to print a hard copy indication of the prize won directly on the coupon 3, and for generating a further message via display 17, such as "YOU ARE A WINNER!!!" (FIG. 3D).

As an alternative, a predetermined time frame may be stored as data within removable memory card 31. The microcomputer 21 can then compare the time frame data rom bar code 11 with the time frame data from memory card 31 and the actual time and date from real time clock 25 and detect therefrom whether or not the coupon is valid.

If, on the other hand, the validation time frame data received from bar code 11 indicates that the coupon is invalid, the microcomputer 21 activates voice synthesizer 23 to so indicate, and generate a message at display 17 such as "EXPIRED DATE", (FIG. 3B). Likewise, printer 29 is activated to print a series of X's on coupon 3 or voiding the bar code 11.

Finally, in the event that the validation time frame data from bar code 11 indicates that the coupon is valid, yet the coupon number data is different from the winning number data stored within removable memory card 31, microcomputer 21 activates voice synthesizer 23 to generate an audible message such as "sorry, try again". At the same time, printer 29 prints a similar message on the coupon 3.

As an alternative, removable memory card 31 may be programmed to store a plurality of specific numbers for comparison with the number stored in bar code 11, in the event that multiple prizes are to be offered. In this case, printer 29 prints onto the coupon a message which corresponds to the specific prize won.

Upon completion of bar code reading and print out, the display 17 generates a message such as "REMOVE TICKET" for prompting a user to extract the coupon 3 from the system, (FIG. 3C).

Thus, each coupon validation terminal is a standalone unit with its own microcomputer, coupon feed mechanism, power transformer (not shown), 40 column printer 29, internal clock 25, bar code scanner 37, memory card 31 and plastic or metal packaging or shroud 7.

By providing a removable memory card 31, the validation terminal of the present invention can be updated with new winning numbers and validation date periods as well as new messages to be printed and voices synthesized. The memory cards can be mailed or otherwise sent to various point of sale operators each time there is a change in coupon promotion strategy.

According to a successful prototype of the invention, the real time clock 25 supplies the exact time and day to microcomputer 21. Furthermore, a battery is incorporated into the real time clock 25 that keeps the clock running for at least ten years without a requirement for change of battery.

The voice synthesizer 23 may be used to control recording and play back of digitized voice. The synthesizer 23 can generate preferably up to 16 messages at a digitizing rate of up to 32 kilobytes per second for control of up to 4 megabytes of voice.

LCD display 17 consists of 2 lines by 16 characters for each line. The display s preferably backlit for night view and is controlled by microcomputer 21.

The housing or cover 7 consists of two parts, as shown in FIG. 4. A bottom part holds the printer 29 and bar code scanner 37, and an upper part holds microcomputer 21, speaker 43 and LCD display 17. The upper part is normally closed with a key lock and, when unlocked, the upper part can swivel around the bottom part for service or changing of the removable memory 31.

In operation, microcomputer 21 executes application software for implementing a data storage and winning number algorithm. The software implements two modes of operation.

According to the first mode of operation, all coupons are printed identically (i.e. there is no distinction between coupons). The coupons are provided with a bar code 11 that corresponds to the valid date (one day only), or a valid date interval (e.g. up to one year maximum), which may be determined by the central leasing authority.

The software algorithm allows for drawing of random numbers in up to 9 categories, in which a category is defined by the probability of winning and the prize associated with such winning. For each draw, the leasing authority decides how many categories of winning numbers there will be.

The categories are organized as follows:

Cat 9 = lowest category, which has highest probability of winning. It consists of 4 bit numbers, for a total of 16 numbers. The leasing authority decides the probability of winning desired for this category. The available probabilities are:
 1 out of 16 = 6.26%
 2 out of 16 = 12.5%
 3 out of 16 = 18.7%
 4 out of 16 = 25.0%
 5 out of 16 = 32.2%
 6 out of 16 = 37.5%
 7 out of 16 = 43.7%
 8 out of 16 = 50.0%
 9 out of 16 = 56.2%
 10 out of 16 = 62.5%
 11 out of 16 = 68.7%
 12 out of 16 = 75.0%
 13 out of 16 = 81.2%
 14 out of 16 = 87.5%
 15 out of 16 = 93.7%
 16 out of 16 = 100%

Cat 8 = next higher category. It consists of 6 bit numbers, for a total of 64 numbers. The leasing authority decides the probability of winning desired for this category. The available probabilities are:
 1 out of 64 = 0.015625 = 1.56%
 2 out of 64 = 0.031250 = 3.12%
 3 out of 64 = 0.046875 = 4.68%
 4 out of 64 = 0.062500 = 6.25%

Cat 7 = next higher category. It consists of 7 bit numbers, for a total of 128 numbers. The leasing authority decides the probability of winning desired for this category. The available probabilities are:
 1 out of 128 = 0.007813 = 0.78%
 2 out of 128 = 0.015625 = 1.56%
 3 out of 128 = 0.023439 = 2.34%
 4 out of 128 = 0.031252 = 3.12%

Cat 6 = next higher category. It consists of 8 bit numbers, for a total of 256 numbers. The leasing authority decides the probability of winning desired for this category. The available probabilities are:
 1 out of 256 = 0.4%
 2 out of 256 = 0.78%
 3 out of 256 = 1.17%
 4 out of 256 = 1.56%

Cat 5 = next higher category. It consists of 10 bit numbers, for a total of 1024 numbers. The leasing authority decides the probability of winning desired for this category. The available probabilities are:
 1 out of 1024 = 0.097%
 2 out of 1024 = 0.195%
 3 out of 1024 = 0.292%
 4 out of 1024 = 0.390%

Cat 4 = next higher category. It consists of 12 bit numbers, for a total of 4096 numbers. The leasing authority decides the probability of winning desired for this category. The available probabilities are:
 1 out of 4096 = 0.0244%
 2 out of 4096 = 0.0488%
 3 out of 4096 = 0.0732%
 4 out of 4096 = 0.0976%

Cat 3 = next higher category. It consists of 14 bit numbers, for a total of 16,384 numbers. The leasing authority decides the probability of winning desired for this category. The available probabilities are:
 1 out of 16,384 = 0.0061%
 2 out of 16,384 = 0.0122%
 3 out of 16,384 = 0.0183%
 4 out of 16,384 = 0.0244%

Cat 2 = next higher category. It consists of 16 bit numbers, for a total of 65,536 numbers. The leasing authority decides the probability of winning desired for this category. The available probabilities are:
 1 out of 65,536 = 0.0015%
 2 out of 65,536 = 0.0030%
 3 out of 65,536 = 0.0046%
 4 out of 65,536 = 0.0061%

Cat 1 = next higher category. It consists of 18 bit numbers, for a total of 262,144 numbers. The leasing authority decides the probability of winning desired for this category. The available probabilities are:
 1 out of 262,144 = 0.00038%
 2 out of 262,144 = 0.00076%
 3 out of 262,144 = 0.00114%
 4 out of 262,144 = 0.00152%

Cat 0 = highest category. It consists of 20 bit numbers, for a total of 1,048,576 numbers. The leasing authority decides the probability of winning desired for this category. The available probabilities are:
 1 out of 1,048,576 = 0.000095%
 2 out of 1,048,576 = 0.000191%
 3 out of 1,048,576 = 0.000286%
 4 out of 1,048,576 = 0.000381%

Once the probability has been decided for each category, all winning tickets will win the same prizes in that category. A category can be "enabled", or "disabled"

by means of programming microcomputer 21 via emory card 31, by the leasing authority. A disabled category means that no tickets are participating in that category, i.e. there can be no "wins" in that category). The "enable", "disable" function is programmed in an internal EPROM of microcomputer 21, and cannot be changed, unless the EPROM is also changed.

Consider the following example in which categories 0, 2 and 9 are enabled; cat 0 has one winning ticket, (prize=a car); cat 2 has two winning tickets (prize=a trip to Las Vegas); and cat 9 has sixteen winning tickets (prize=10% discount).

Assuming 10 million tickets are distributed, one ticket may win the grand prize (i.e. the car). This event is not guaranteed, because it is statistically possible that no random draw will produce a winner in the 1 out of 1,048,575 category, when the total number of draws is 10 million.

Two or a few more tickets may win in cat 2 (i.e. the trip). The exact number of winners cannot be guaranteed, because of the random nature of the draw, and the limited number of tickets.

However, all tickets will win the 10% discount, because cat 9 has been enabled with 100% chance of winning.

According to the second mode of operation, the bar code 11 is used to identify the valid date or date interval, and a ticket number. Typically, each ticket will have its own number of up to 6 decimal digits. This number or a subset of it is compared with a predefined "winning" number, (or numbers) stored in the EPROM.

The machine converts internally the ticket's decimal number into a binary representation for faster calculations, and to allow the tickets to participate in any of the nine categories. A category is defined as in mode 1 by the number of binary digits that are used for comparison with the winning number. The highest category will require all 20 bits to match. The next lower category will require the lower 18 bits to match, the next lower category will require the lower 16 bits to match, etc.

In this mode, the leasing authority can decide up to four winning numbers in each category. Each category can be enabled, or disabled, as decided by the leasing authority. This ion mode has the advantage that the number of winning tickets in each category can be tightly controlled, or predicted by the leasing authority, as a function of
a) the winning number or numbers selected
b) the enabled, or disabled categories, and
c) the total number of tickets issued.

Just as in mode 1, all winning tickets in the same category will have the same prize.

Considering the following additional example, there is a single winning number per category, and a predefined winning #=057,912. In the event all tickets have a 6 digit serial number, and 1 million tickets are distributed, Cats 0, 1, 2, 8 and 9 are enabled, with 1 match allowed per category e.g. cat 0, prize=a car; cat 1, prize=a trip; cat 2, prize=a TV; cat 8, prize=$10; cat 9, prize=$1,) then there will be one winner of the car, four winners of the trip, sixteen winners of the TV and 16,384 winner of the $10, and 65,536 winners of $1.

The memory card 31 contains a byte of data indicating the number of categories. Each category consists of three variables. The first variable consists of 2 bytes and indicates a winning population out of a total population. The second byte indicates the total population. The third byte is an index into voice and printer messages, with a maximum of 16 such messages.

Returning to a consideration of the mode of operation of the invention with reference to FIG. 2, the LCD display 17 will initially indicate a READY condition. When a coupon is inserted into the system, optodetectors 35 sense the paper, and generate signals to the microcomputer 21 for fast feeding the paper forward via roller 33, and immediately activating the scanner head movement with backward feed of paper. The scanner 37 detects the bar code 11. If the bar code is not detected, the distal end optodetector 35 will detect the far edge of this coupon, the scanner head gear motor 49 is stopped, the coupon 3 is fed in reverse, and the display 17 and voice synthesizer 23 are activated to generate a TRY AGAIN message (with the LCD backlight). If no try occurs within 1 second, the LCD backlight will go off and the READY message will appear.

If the bar code 11 is detected, the microcomputer 21 compares the date cf the coupon with the current record from time clock 25, (12 characters=6 for start and 6 for end corresponding to day/month/year). There are also six characters for the number that is read that might be or may not be a winner.

There are five different categories. The first category is a number that ends with a specific single digit that can be compared with a number stored in a memory location which, according to the successful prototype was location FF000, FF001, (FF002 functions as a check sum of FF000 and FF001). The second category matches two digits at location FF003, FF004, (FF005 will be check sum). The third category matches 3 digits stored in location FF004. The fourth category matches 4 digit number locations FF006, FF007, FF008, FF009, (FF00A=check sum). The fifth category will be like the others with 5 digits.

Each category match results in a predetermined appropriate message being generated by voice synthesizer 23 and memory locations FF3FE, FF3FF indicate which messages are valid (e.g. messages 1,2,3,4,5, 16 may correspond to FF3FE=00011111, FF3FF=10000000). Location FF3F0 stores a code for allowing the set up of real time clock 25. Location FF3F1 stores a code to allow recording of voice messages. All the data is preferably secured by encryption there of in a well known manner. To encrypt the data, the microcomputer uses a key code stored in location FF3FD.

Of course, the specific memory locations referred to above are illustrative only of the successful prototype of the present invention. Other memory locations and data values may be used in alternative embodiments of the invention.

The scanning and printing apparatus of the invention is shown in greater detail with reference to FIGS. 4–8. More particularly, the scanner mechanism comprises a bar code scanner and A/D converter 37 mounted on a movable carriage that travels laterally along a pair of rail guides 48 under the influence of a small gear motor 49 and linkage 51.

Figure 6A:
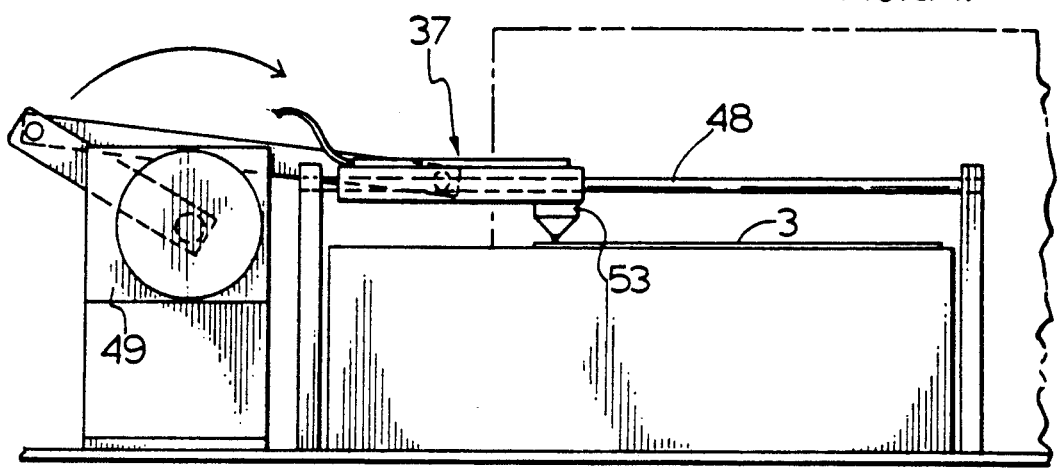
FIGS. 6A-6C are front elevation views of the movable scanner of FIG. 4 in successive positions.
Figure 6B:
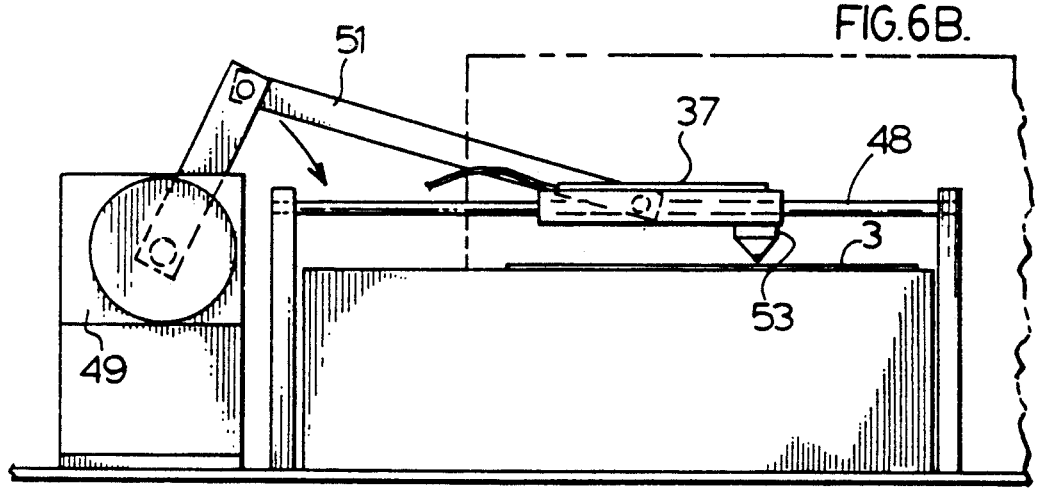
Figure 6C:
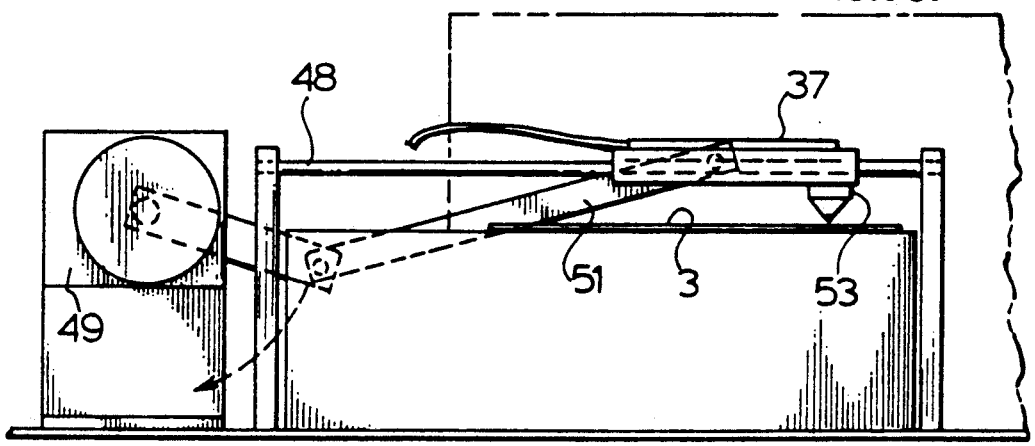

As shown best with reference to FIGS. 6A–6C, the rotational movement of gear motor 49 is translated to lateral movement of scanner 37 by means of the linkage 51. The scanner 37 incorporates an LED emitter/sensor 53 as discussed above with reference to FIG. 2. The emitter/sensor 53 is shown n FIGS. 6A, 6B and 6C traversing the width of coupon 3 for reading the bar code disposed thereon.

Figure 8:
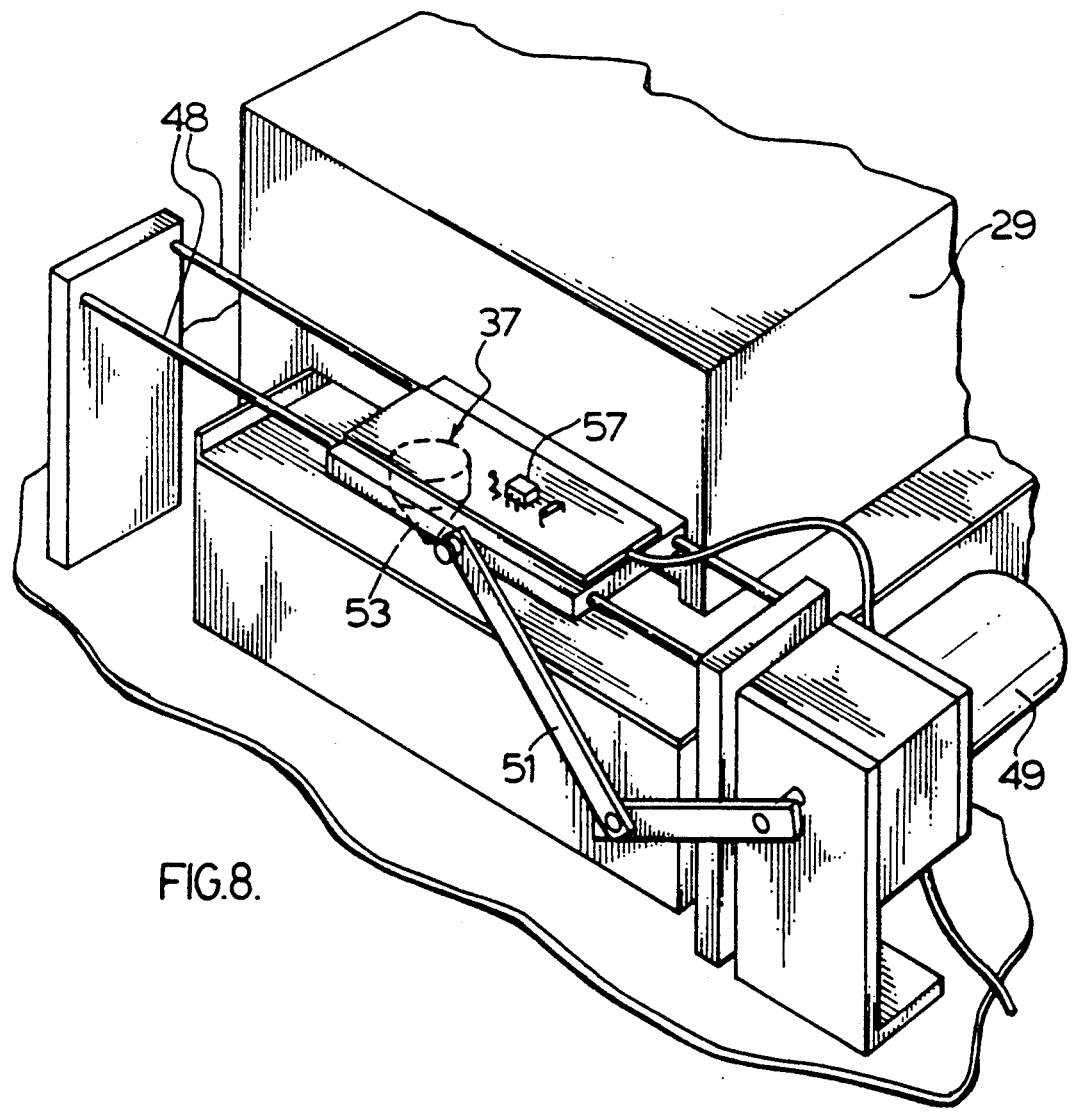
FIG. 8 is a rear perspective view of the movable scanner of FIG. 4.

As shown in the perspective view of FIG. 8, the scanner 37 is in the form of a miniature printed circuit board for incorporating the emitter/sensor 53 and associated scanner circuitry and analogue-to-digital (A/D) converter 57.

Figure 7:
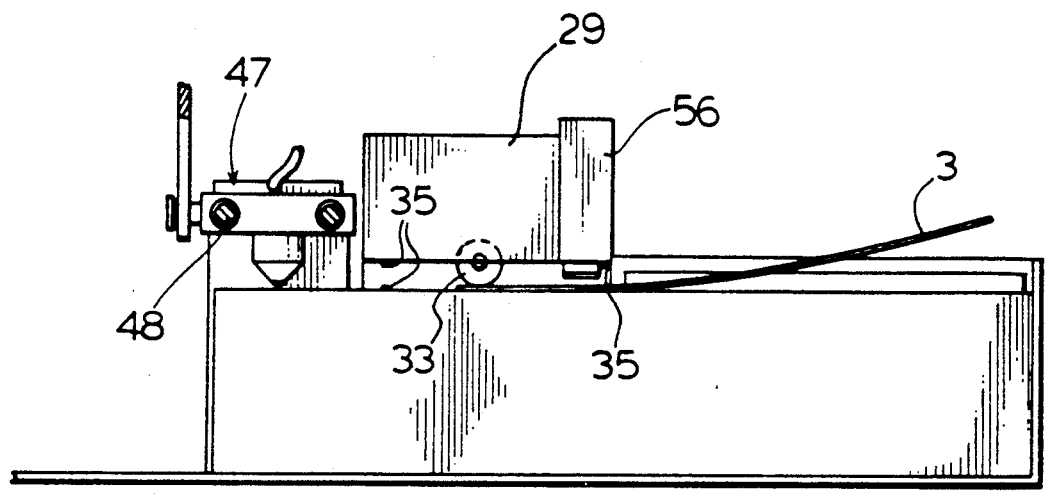
FIG. 7 is a side elevation view of the scanner of FIG. 4 and a coupon feeder.

Turning to FIG. 7, the printer mechanism 29 is shown in greater detail comprising a pair of optodetectors 35 for sensing location of the leading edge of coupon 3. The coupon is fed into and out of the printer mechanism 29 by means of a roller 33. In addition, printer mechanism 29 incorporates a ribbon and print head 56 for applying printed messages to the coupon 3 or for voiding the coupon by printing a series of X's through the bar code 11.

In summary, the microcomputer controlled coupon validation terminal of the present invention is expected to virtually eliminate mis-redemption of coupons by use of an internal real time clock coupled with a bar code scanner for detecting time frame data from a coupon and thereby ascertaining whether or not the coupon is valid. The voice synthesis circuit provides a novel and friendly indication to the coupon redeemer as to whether or not he or she has won a prize.

Modifications are possible within scope of this invention as defined by the claims appended hereto.

We claim:

1. A coupon validation system for interpreting coupons presented thereto, each of said coupons incorporating a bar code having a range of validation dates and a message code, said system comprising:
   a) a real time clock for maintaining a current time and date record;
   b) means for storing one or more winning number codes;
   c) means for receiving a coupon presented to said system and in response reading said bar code; and
   d) means for comparing said range of validation dates with said current time and date record and in the event said current time and date record is not within said range of validation dates then rejecting said coupon, and in the event said current time and date record is within said range of validation dates then comparing said one or more winning number codes with said message code and in the event they are equal generating a message for indicating that said coupon is a winner, and in the event said one or more winning number codes and said message code are not equal then generating an alternative message for indicating that said coupon is not a winner.

2. A coupon validation system as defined in claim 1, further comprising a printer for overprinting said bar code in the event said coupon is rejected, and for printing a message on said coupon for indicating that a prize has been won in the event said coupon is a winner.

3. A coupon validation system as defined in claim 1, further comprising a voice synthesizer for generating a rejection audio message in the event said coupon is rejected and generating a try again message in the event said coupon is not a winner.

4. A coupon validation system as defined in claim 1, wherein said means or receiving further comprises:
   a) optodetector means for detecting an edge of said coupon;
   b) means for feeding said coupon to a predetermined position responsive to said detected edge;
   c) a bar code scanner oriented over said bar code when said coupon is at said predetermined position: and
   d) means for moving said bar canner across said bar code for reading said bar code.

5. A coupon validation system as defined in claim 3, wherein said means for storing further comprises a removable programmable memory cartridge containing said winning number codes and one or more voice messages adapted to be generated by said voice synthesizer.

6. A coupon validation system as defined in claim 1, further comprising a visual display for generating prompt messages to inform a user as to the status and operation of said system.

7. A coupon validation system as defined in claim 6, wherein said visual display is an LCD.

8. A coupon validation system as defined in claim 4, wherein said optodetector means further comprises a first optodetector for detecting said edge of said coupon at a first position within said system and in response generating a first control signal to said means for feeding to initiate movement of said coupon into said means for receiving, and a second optodetector for detecting said edge at said predetermined position and generating a further control signal to said means for feeding in order to arrest movement of said coupon at said predetermined position.

9. A coupon validation terminal as defined in claim 4, wherein said means for feeding comprises a motor activated roller.

10. A coupon validation terminal as defined in claim 4, wherein said bar code scanner is mounted on a pair of rail guides for lateral movement across said bar code.

11. A coupon validation terminal as defined in claim 10, wherein said means for moving comprises a gear motor for effecting rotational movement and a linkage connected to said motor and said bar code scanner for translating said rotational movement to lateral movement of said scanner along aid pair rail guides.

12. A coupon validation system for interpreting coupons presented thereto, each of said coupons incorporating a bar code having a range of validation dates and a message code, said system comprising:
   a) a real time clock for maintaining a current time and date record;
   b) means for storing one or more winning number codes;
   c) means for receiving a coupon presented to said system and in response reading said bar code; and
   d) means for comparing said range of validation dates with said current time and date record and in the event said current time and date record is not within said range of validation dates then rejecting said coupon, and in the event said current time and date record is within said range of validation dates then comparing said one or more winning number codes with said message code and in the event they are equal generating a message for indicating that said coupon is a winner, and in the event said one or more winning number codes and said message code are not equal then generating an alternative message for indicating that said coupon is not a winner, further comprising a printer for overprinting said bar code in the event said coupon is rejected, and for printing a message on said coupon for indicating that a prize has been won in the event said coupon is a winner.

13. A coupon validation system for interpreting coupons presented thereto, each of said coupons incorporating a bar code having a range of validation dates and a message code, said system comprising:
   a) a real time clock for maintaining a current time and date record;
   b) means for storing one or more winning number codes;
   c) means for receiving a coupon presented to said system and in response reading said bar code; and
   d) means for comparing said range of validation dates with said current time and date record and in the event said current time and date record is not within said range of validation dates then rejecting said coupon, and in the event said current time and date record is within said range of validation dates then comparing said one or more winning number codes with said message code and in the event they are equal generating a message for indicating that said coupon is a winner, and in the event said one or more winning number codes and said message code are not equal then generating an alternative message for indicating that said coupon is not a winner,
   further comprising a voice synthesizer for generating a rejection audio message in the event said coupon is rejected and generating a try again message in the event said coupon is not a winner.

14. A coupon validation system for interpreting coupons presented thereto, each of said coupons incorporating a bar code having a range of validation dates and a message code, said system comprising:
   a) a real time clock for maintaining a current time and date record;
   b) means for storing one or more winning number codes;
   c) means for receiving a coupon presented to said system and in response reading said bar code; and
   d) means for comparing said range of validation dates with said current time and date record and in the event said current time and date record is not within said range of validation dates then rejecting said coupon, and in the event said current time and date record is within said range of validation dates then comparing said one or more winning number codes with said message code and in the event they are equal generating a message for indicating that said coupon is a winner, and in the event said one or more winning number codes and said message code are not equal then generating an alternative message for indicating that said coupon is not a winner,
   wherein said means for receiving further comprises:
   e) optodetector means for detecting an edge of said coupon;
   f) means for feeding said coupon to a predetermined position responsive to said detected edge;
   g) a bar code scanner oriented over said bar code when said coupon is at said predetermined position; and
   h) means for moving said bar code scanner across said bar code for reading said bar code.

15. A coupon validation system defined in claim 14, wherein said optodetector means further comprises a first optodetector for detecting said edge of said coupon at a first position within said system and in response generating a first control signal to said means for feeding to initiate movement of said coupon into said means for receiving, and a second optodetector for detecting said edge at said predetermined position and generating a further control signal to said means for feeding in order to arrest movement of said coupon at said predetermined position.

16. A coupon validation terminal as defined in claim 14, wherein said means for feeding comprises a motor activated roller.

17. A coupon validation terminal as defined in claim 14, wherein said bar code scanner is mounted on a pair of rail guides for lateral movement across said bar code.

18. A coupon validation terminal as defined in claim 17, wherein said means for moving comprises a gear motor for effecting rotational movement and a linkage connected to said motor and said bar code scanner for translating said rotational movement to lateral movement of said scanner along said pair of rail guides.

19. A coupon validation system as defined in claim 13 wherein said means for storing further comprises a removable programmable memory cartridge containing said winning number codes and one or more voice messages adapted to be generated by said voice synthesizer.

20. A coupon validation system for interpreting coupons presented thereto, each of said coupons incorporating a bar code having a range of validation dates and a message code, said system comprising:
   a) a real time clock for maintaining a current time and date record;
   b) means for storing one or more winning number codes;
   c) means for receiving a coupon presented to said system and in response reading said bar code; and
   d) means for comparing said range of validation dates with said current time and date record and in the event said current time and date record is not within said range of validation dates then rejecting said coupon, and in the event said current time and date record is within said range of validation dates then comparing said one or more winning number codes with said message code and in the event they are equal generating a message for indicating that said coupon is a winner, and in the event said one or more winning number codes and said message code are not equal then generating an alternative message for indicating that said coupon is not a winner,
   further comprising a visual display for generating prompt messages to inform a user as to the status and operation of said system.

21. A coupon validation system as defined in claim 20, wherein said visual display is an LCD.

22. A scanner for detecting a bar code disposed on an article, comprising:
   a) optodetector means for detecting an edge of said article;
   b) means for feeding said article to a predetermined position responsive to said detected edge;
   c) a movable emitter/sensor oriented over said bar code when said article is at said predetermined position; and
   d) means for moving said emitter/sensor across said bar code for reading said bar code,
   wherein said optodetector means further comprises a first optodetector for detecting said edge of said article at a first position and in response generating a first control signal to said means for feeding to initiate movement of said article into said scanner, and a second optodetector for detecting said edge at said predetermined position and generating a further control signal to said means for feeding in order to arrest movement of said article at said predetermined position.

23. A scanner as defined in claim 22, wherein said means for feeding comprises a motor activated roller.

24. A scanner as defined in claim 23, wherein said emitter/sensor is mounted on a pair of rail guides for lateral movement across said bar code.

25. A scanner as defined in claim 24, wherein said means for moving comprises a gear motor for effecting rotational movement and a linkage connected to said motor and said emitter/sensor for translating said rotational movement to lateral movement of said emitter/sensor along said pair of rail guides.

* * * * *